United States Patent [19]

Davis

[11] Patent Number: 4,760,645

[45] Date of Patent: Aug. 2, 1988

[54] POLE MOUNTED PRUNING TOOL WITH ADJUSTABLE LENGTH OPERATING LEVER

[75] Inventor: Richard E. Davis, Pasadena, Calif.

[73] Assignee: S.M.S. Industries, Inc., Glendale, Calif.

[21] Appl. No.: 20,474

[22] Filed: Mar. 2, 1987

[51] Int. Cl.⁴ ............................................ B26B 13/00
[52] U.S. Cl. ...................................................... 30/249
[58] Field of Search ...................... 30/249, 296 R–298

[56] References Cited

U.S. PATENT DOCUMENTS 1,836,014 12/1931 Chamberlain ................ 30/296 A X
2,203,926 6/1940 Porter et al. ...................... 30/249 X Primary Examiner—Douglas D. Watts
Attorney, Agent, or Firm—Samuels, Gauthier, Stevens & Kehoe

[57] ABSTRACT

A pole mounted pruning tool with a pair of cutting jaws, one being pivotally movable in relation to the other to effect a cutting action. The movable jaw is pivoted by an operating lever which has an adjustable length, thereby providing a means of varying the cutting torque.

3 Claims, 1 Drawing Sheet

POLE MOUNTED PRUNING TOOL WITH ADJUSTABLE LENGTH OPERATING LEVER

BACKGROUND OF THE INVENTION

1. Field of the Invention

This invention relates to pole-mounted tools of the type employed to prune tree branches and the like.

2. Description of the Prior Art

Tree pruners conventionally comprise a pair of coacting cutting jaws, one being pivotally movable in relation to the other to effect a cutting action. The movable jaw is connected to a lever arm carrying a sheave. The sheave is located at a fixed radial distance from the pivot axis of the movable jaw. A rope is threaded around the sheave to provide a means of operating the tool from a remote location, e.g., at ground level when the tool is carried on the end of a pole and used to cut branches at an elevated location.

The fixed radial distance between the sheave and the pivot axis of the movable jaw provides a predetermined mechanical advantage which assists cutting. Experience has indicated that this mechanical advantage usually is adequate to effect cutting of a certain range of branch sizes, but is sometimes inadequate to effect cutting of larger branches. The cutting capacity of the tool can be increased by providing a longer level arm. However, as the length of the lever arm is increased, the tool becomes more cumbersome and difficult to handle, particularly when attempting to cut smaller sized tightly congested branches.

Thus, those skilled in the art have deemed it necessary to strike a compromise between cutting capacity and tool maneuverability, with neither being optimized to the fullest extent possible.

SUMMARY OF THE INVENTION

The present invention affords a solution to this dilemma by providing the pruning tool with a variable length lever arm. When cutting smaller branches in tightly congested situations, the length of the lever arm is appropriately shortened to optimize maneuverability and ease of handling. When the congestion has been eliminated, or when only larger and more widely spaced branches are to be cut, the length of the lever arm is appropriately lengthened to increase the mechanical advantage needed to effect cutting.

DETAILED DESCRIPTION OF DISCLOSED EMBODIMENT

Figure 1:
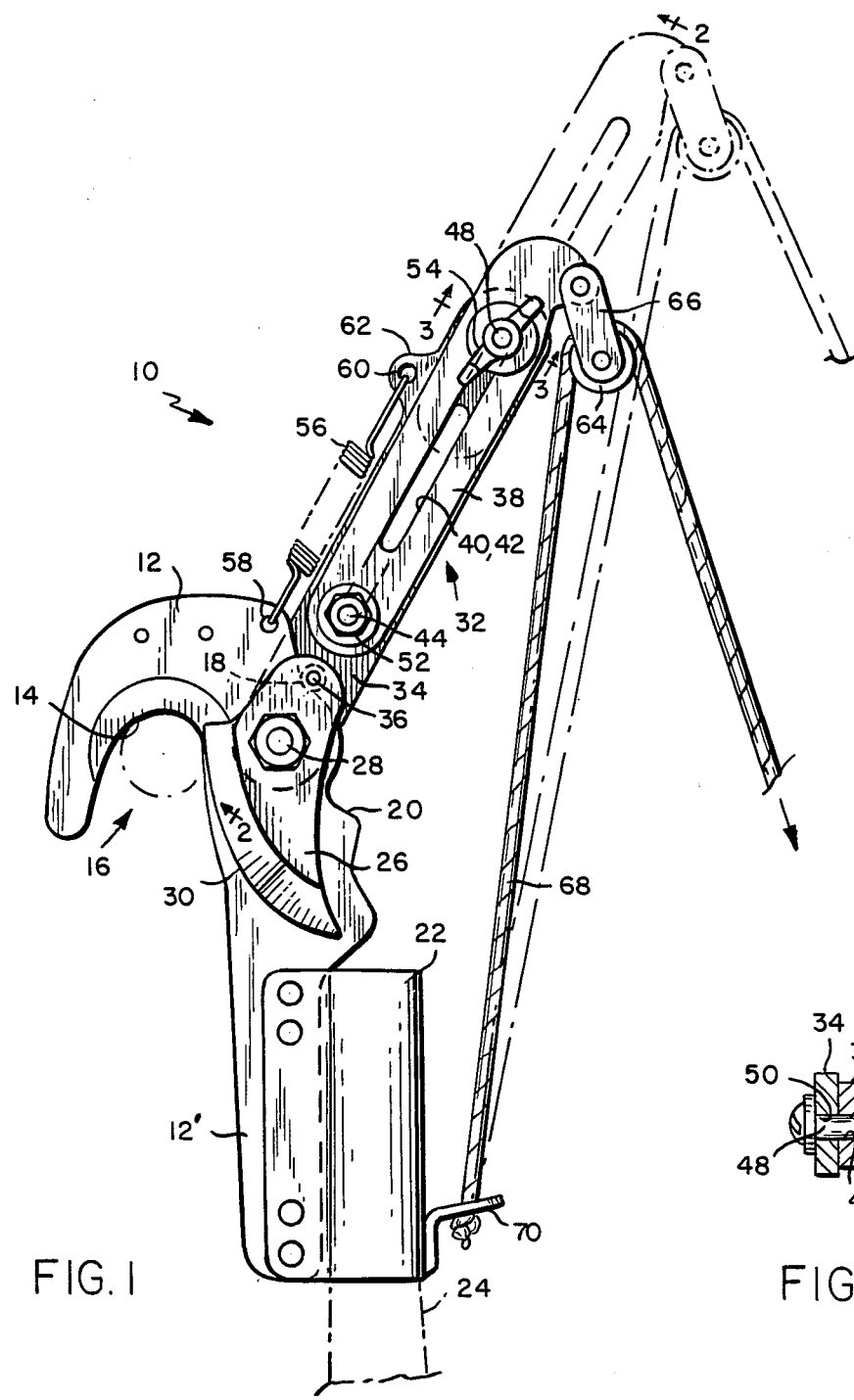
FIG. 1 is a view in side elevation of a pruning tool embodying the concepts of the present invention.
Figure 3:
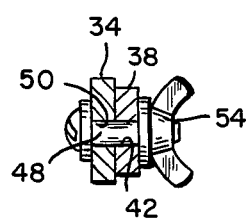
FIGS. 2 and 3 are sectional views taken respectively on lines 2—2 and 3—3 of FIG. 1.
Figure 2:
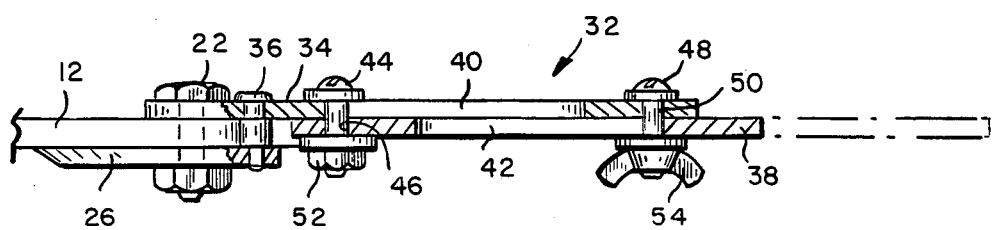

Referring now to the drawings, a pruning tool in accordance with the present invention is generally depicted at 10. The tool includes a first jaw 12 having a front cutting edge 14 which define an open notch 16, and a contoured back edge defining shoulder stops 18, 20. The base portion 12' of jaw 12 is connected to a clamp 22, or other like mounting fixture used to position the tool on the end of a pole 24.

A second jaw 26 is pivotally connected to the first jaw by means of a cross bolt 28. The second jaw has a second cutting edge 30.

An operating lever is generally indicated at 32. The lever has a first base portion 34 which is pivotally connected to the first jaw 12 by means of the cross bolt 28. A pin 36 interconnects and establishes a fixed relationship between the second jaw 26 and the lever base portion 34. A second extensible lever portion 38 overlaps the base portion 34. Both lever portions 34,38 have elongated aligned slots 40,42. A first guide bolt 44 extends through the slot 40 in base portion 34 and through a hole 46 in the extensible portion 38. A second clamping bolt 48 extends through a hole 50 in base portion 34 and through the slot 42 in the extensible portion 38. A hex nut 52 is threaded onto the bolt 44 and is tightened just enough to permit sliding movement of the extensible portion 38 relative to the base portion 34. A wing nut 54 is threaded onto the clamping bolt 48. When tightened, the wing nut clamps the two lever portions together in a mutually fixed relationship. When the wing nut is loosened the extensible portion 38 may be moved along the length of the slots 40,42 to adjust the overall length of the lever arm 32.

A spring 56 is connected at one end as at 58 to the fixed jaw 12, and at the opposite end as at 60 to a lateral ear 62 on the lever base portion 34. The spring resiliently biases the lever 32 is a counter-clockwise direction as viewed in FIG. 1, thereby causing the pin 36 to abut shoulder stop 38 which locates the second jaw 26 in an inoperative position to one side of the cutting notch 16.

A sheave 64 is connected by means of a pivotal bracket 66 to the distal end of the extensible lever portion 38. A rope or other like flexible elongated element 68 is fixed at one end as at 70 to the tool and is passed around the sheave 64, with the opposite end of the rope (not shown) being available at the base of the pole 24.

It will thus be seen that the arrangement of the sheave 64, lever 32 and second jaw 26 is such that a tensile force applied to the rope 68 will act through the mechanical advantage afforded by the radial distance between the sheave and the pivotal axis defined by cross bolt 28 to exert a cutting torque in a clockwise direction as viewed in FIG. 1. The cutting torque will overcome the biasing action of spring 56 and will pivotally urge the second jaw across the cutting notch 16. The first and second cutting edges 14,30, will thus effect a cutting action on a branch or the like received in the cutting notch. The cutting stroke of the second jaw is limited by engagement of the pin 36 with shoulder stop 20.

When cutting small branches and when working in tightly congested situations, the maneuverability of the tool is enhanced by shortening the length of the lever arm 32, for example as illustrated by the solid lines in FIG. 1. When larger branches are encountered, the tool's mechanical advantage can be significantly increased by lengthening the lever arm, for example as shown by the broken lines in FIG. 1.

I claim:

1. A pruning tool, comprising:
   a first jaw having a first cutting edge defining an open notch;
   a second jaw having a second cutting edge, said second jaw being pivotally adjustable in relation to said first jaw between an open position permitting a branch or the like to be received in said notch, and a cutting position at which said first and second cutting edges coact to sever said branch;
   spring means for yieldably biasing said second jaw into said open position;

mounting means associated with said first jaw for removably mounting said tool on the end of an elongated pole, thereby permitting the tool to be employed at elevated locations;

a lever having first and second portions, said first lever portion being fixed in relation to said second jaw and having a first hole and a first elongated slot, said second lever portion having a second hole and a second elongated slot, said slots being aligned one with the other, a guide bolt extending through said first slot and second hole, a clamping bolt extending through said first hole and said second slot, a first nut coacting with said guide bolt to hold said lever portions together while permitting said second lever portion to slide longitudinally with respect to said first lever portion along the length of said slots, and a second nut coacting with said clamping bolt to releasably fix and second lever portion relative to said first lever portion a sheave carried by said second lever portion at a radial distance from the pivotal axis of said second jaw, the longitudinal sliding movement of said second lever portion relative to said first lever portion being effective to vary said radial distance; and a rope-like flexible elongated element extending around said sheave, the arrangement of said lever and sheave being such that a tensile force applied to said elongated element will act through a mechanical advantage afforded by said radial distance to exert a cutting torque which overcomes the biasing action of said spring means and which pivotally urges said second jaw into said cutting position.

2. The pruning tool of claim 1 wherein said spring means comprising a coiled tension spring connected at one end to said first jaw and at the opposite end to the first portion of said lever.

3. The pruning tool of claim 1 wherein said second nut comprises a wing nut.

* * * * *